US008605634B2

(12) United States Patent
Jeon et al.

(10) Patent No.: US 8,605,634 B2
(45) Date of Patent: Dec. 10, 2013

(54) APPARATUS FOR CONTROLLING POWER OF WIRELESS DEVICE AND METHOD THEREOF (75) Inventors: Beom Jin Jeon, Seoul (KR); Joong Heon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 256 days.

(21) Appl. No.: 12/997,372

(22) PCT Filed: Jun. 11, 2009

(86) PCT No.: PCT/KR2009/003144
§ 371 (c)(1),
(2), (4) Date: Feb. 1, 2011

(87) PCT Pub. No.: WO2009/151289
PCT Pub. Date: Dec. 17, 2009

(65) Prior Publication Data
US 2011/0116429 A1   May 19, 2011

Related U.S. Application Data (60) Provisional application No. 61/060,484, filed on Jun. 11, 2008.

(30) Foreign Application Priority Data

Nov. 28, 2008 (KR) .................. 10-2008-0119575

(51) Int. Cl.
*H04W 52/02* (2009.01)
*G08C 17/02* (2006.01)
(52) U.S. Cl.
USPC .................. 370/310; 370/311; 455/343.2

(58) Field of Classification Search
USPC .................. 370/310; 455/343.1–343.6
See application file for complete search history.

(56) References Cited

U.S. PATENT DOCUMENTS

| 6,622,251 B1 | 9/2003 | Lindskog et al. |
| 2002/0105970 A1* | 8/2002 | Shvodian ............ 370/468 |

(Continued)

FOREIGN PATENT DOCUMENTS

| CN | 1354939 A | 6/2002 |
| CN | 1898913 A | 1/2007 |

(Continued)

OTHER PUBLICATIONS

Park et al., "Power Saving Algorithms for Wireless Sensor Networks on IEEE 802.15.4," Topics in Ad Hoc and Sensor Networks, IEEE Communications Magazine, vol. 46, No. 6, Jun. 1, 2008, pp. 148-155.

(Continued)

*Primary Examiner* — Michael Thier
*Assistant Examiner* — Brian Cox
(74) *Attorney, Agent, or Firm* — Birch, Stewart, Kolasch & Birch, LLP (57) ABSTRACT A method of controlling the power consumption of a wireless station is disclosed. The present invention includes waking-up a coordinator in a sleep state, entering an awake state and if a signal for turning on a peripheral station is received in the awake state, transmitting an awake message to the peripheral station via a beacon signal during a beacon timeslot. Accordingly, the power consumption of a coordinator in a WPAN network may be reduced, power control by a peripheral station may be facilitated, and inefficient operation and management of the network may be prevented.

6 Claims, 5 Drawing Sheets

(56) References Cited

U.S. PATENT DOCUMENTS

| | | |
|---|---|---|
| 2005/0238044 A1* | 10/2005 | Osterloh et al. .............. 370/460 |
| 2006/0023684 A1 | 2/2006 | Seo et al. |
| 2006/0146745 A1 | 7/2006 | Cai et al. |
| 2006/0203790 A1 | 9/2006 | Hong et al. |
| 2007/0002820 A1 | 1/2007 | Xhafa |
| 2007/0058665 A1 | 3/2007 | Ho et al. |
| 2007/0115903 A1 | 5/2007 | Liu |
| 2007/0133457 A1 | 6/2007 | Doi et al. |
| 2008/0130543 A1* | 6/2008 | Singh et al. .................... 370/311 |
| 2008/0212547 A1 | 9/2008 | Sugaya et al. |
| 2008/0232286 A1* | 9/2008 | Habetha et al. ............... 370/311 |
| 2008/0291873 A1 | 11/2008 | Benveniste |
| 2009/0279487 A1 | 11/2009 | Reumerman et al. |
| 2010/0002659 A1 | 1/2010 | Doi et al. |

FOREIGN PATENT DOCUMENTS

| | | |
|---|---|---|
| CN | 1918860 A | 2/2007 |
| CN | 101137242 A | 3/2008 |
| JP | 2006-20290 A | 1/2006 |
| JP | 2009-530902 A | 8/2009 |
| JP | 2009-540689 A | 11/2009 |
| WO | WO 03/052950 A1 | 6/2003 |
| WO | WO 2004/019539 A2 | 3/2004 |
| WO | WO 2006/039607 A1 | 4/2006 |
| WO | WO 2007/066741 A1 | 6/2007 |
| WO | WO 2007/106042 A1 | 9/2007 |
| WO | WO 2007/136189 A1 | 11/2007 |
| WO | WO 2007/146685 A1 | 12/2007 |
| WO | WO 2008/044885 A2 | 4/2008 |

OTHER PUBLICATIONS

Yin et al., "Adaptive Contention Access Suspension on IEEE 802.15.3 MAC", IEEE Fourth International Conference on Broadband Communications, Networks and Systems 2007, BROADNETS 2007, Sep. 10, 2007, XP031276628, Sections II, V, pp. 187-196.

* cited by examiner

Fig. 10

APPARATUS FOR CONTROLLING POWER OF WIRELESS DEVICE AND METHOD THEREOF

This application is the National Phase of PCT/KR2009/003144 filed on Jun. 11, 2009, which claims priority under 35 U.S.C. 119(e) to U.S. Provisional Application No. 61/060,484 filed Jun. 11, 2008 and under 35 U.S.C. 119(a) to Patent Application No. 10-2008-0119575 filed in the Republic of Korea on Nov. 28, 2008, both of which are hereby expressly incorporated by reference into the present application.

TECHNICAL FIELD

The present invention relates to a method of power control for communication between wireless stations in wireless personal area network (WPAN), and more particularly, to a method of controlling power of various stations in the WPAN. Although the present invention is applicable to a wide range of applications, it is particularly applicable to reducing the power consumption of a coordinator in a WPAN and facilitating power control of peripheral stations in the WPAN.

BACKGROUND ART

Due to the rapid advancement of technology, the number of products incorporating digital technology is rapidly increasing. For instance, various digital products including DVD players, cable set-top boxes (STB), digital video cassette recorders (DVCR), digital TVs (DTV), personal computers (PC), etc. may be connected to a common network. These stations may implement various protocols to exchange audio-visual and other data with stations on the common network.

The IEEE 802.15 Working Group is establishing a standard for a WPAN that may include mobile and stationary stations within close proximity and is actively attempting to apply this standard to home automation systems, remote control systems, ubiquitous sensor networks, etc. Specifically, the currently standardized IEEE 802.15.3 is named HR-WPAN (high rate-WPAN) and specifies a wireless communication network capable of a high-speed data transfer rate over 55 Mb/s. HR-WPAN includes short range communication between 5 and 55 meters for wireless multimedia transfer in a home network, a data transfer rate over 55 Mbps, dynamic configuration of network topology for element stations, time division multiple access (TDMA) support for quality of service (QoS) tiers and data stream security, peer-to-peer connectivity, etc.

The WPAN includes a coordinator that provides the basic communications timing in the WPAN, including transmitting a beacon signal, and the coordinator may manage the QoS requirements of the WPAN. The WPAN coordinator needs a WPAN-wide power saving scheme for the following two reasons.

First, in an IEEE 802.15.3 network, a network access point (AP) as found in a 802.11 network is not found. This is because a WPAN-series network is a peer-to-peer network including a dynamic topology based upon the WPAN enabled stations in range of the WPAN network. Hence, a fixed AP is not contemplated.

Second, a WPAN station functioning as the coordinator may be one of the large variety of devices. Each of these various stations may have different standby states based upon their design, operation, and power requirements. Therefore, the power saving modes of the various stations may be very different from each one another. Hence, power management of the WPAN by the coordinator is desired.

DISCLOSURE OF INVENTION

Technical Problem

A station functioning as a coordinator is placed in a sleep state to reduce power consumption except for a period of time when a beacon message is transmitted. If a peripheral station attempts to communicate with the coordinator it is unable to do so because the coordinator is in sleep state during the communication timeslot allocated to the peripheral station. So, the peripheral station is unable to communicate with the coordinator when it is in a sleep state.

Technical Solution

To overcome this problem, the coordinator may be left in an awake state thus increasing power consumption, or may quickly alternate between the sleep and awake states in order to receive communications from the peripheral stations during their allocated communication timeslot, which also increases power consumption.

Advantageous Effects

The present invention includes waking-up a coordinator in a sleep state, entering an awake state and if a signal for turning on a peripheral station is received in the awake state, transmitting an awake message to the peripheral station via a beacon signal during a beacon timeslot. Accordingly, the power consumption of a coordinator in a WPAN network may be reduced, power control by a peripheral station may be facilitated, and inefficient operation and management of the network may be prevented.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Accordingly, the present invention is directed to an apparatus for controlling power of a wireless device and method thereof that substantially obviates one or more of the problems due to limitations and disadvantages of the related art.

An advantage of the present invention is to provide a WPAN coordinator where power consumption may be reduced. Further, power control of a peripheral station is facilitated to reduce power consumption. Finally, inefficient operation and management of resources may be prevented.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of controlling a coordinator for use in a wireless network including a station, the coordinator having an awake state to receive or transmit information and a sleep state to save power, the method including: placing the coordinator in an awake state; transmitting a beacon signal to the station during a beacon timeslot; and maintaining the awake state for a predetermined period after transmitting the beacon signal to receive information from the station.

In another aspect of the present invention, a method of controlling a coordinator for use in a wireless network including stations, the coordinator having an awake state to receive or transmit information and a sleep state to save power, the method including: receiving first awake information during a predetermined period, the first awake information indicating a change to the awake state of the coordinator from one of stations; receiving second awake information from one of the stations, the second awake information indicating a change to the awake state of a target station; and transmitting a beacon signal during a beacon period including third awake information indicating a change to the awake state of the target station, wherein the coordinator is in the awake state at least during the predetermined period and beacon period.

In another aspect of the present invention, a method of controlling a coordinator for use in a wireless network including stations, the coordinator having an awake state to receive or transmit information and a sleep state to save power, the method including: receiving group awake information from one of the stations during a predetermined period where the group awake information indicates a change to the awake state of the stations; and transmitting a beacon signal to the stations during a beacon period where the beacon signal includes awake information indicating a change to the awake state of the stations, wherein the coordinator is in the awake state at least during the predetermined period and the beacon period.

In another aspect of the present invention, a method for controlling a station for use in a wireless network including a coordinator, the coordinator having an awake state to receive or transmit information and a sleep state to save power, the method including: placing the coordinator in an awake state; transmitting awake information to a coordinator during a predetermined period where the awake information indicates a change to the awake state of the coordinator; and maintaining the awake state during a beacon timeslot to receive a beacon signal from the coordinator.

In another aspect of the present invention, a method for controlling a station for use in a wireless network including a coordinator, the coordinator having an awake state to receive or transmit information and a sleep state to save power, the method including: transmitting first awake information to a coordinator during a predetermined period where the first awake information indicates a change to the awake state of the coordinator; and transmitting second awake information to the coordinator where the second awake information indicates a change to the awake state of a target station.

In another aspect of the present invention, a method for controlling a station for use in a wireless network including a coordinator, the coordinator having an awake state to receive or transmit information and a sleep state to save power, the method including: receiving a beacon signal from a coordinator during a beacon timeslot, the beacon signal including group awake information indicating a change to the awake state of the station; and changing to the awake state according to the awake information received.

In another aspect of the present invention, an apparatus for controlling power consumption in a wireless network including stations having an awake state to receive or transmit information and a sleep state to save power, the apparatus including: a communication module that receives data from an external station and that transmits data to the external station; and a controller that maintains the awake state during a beacon timeslot to transmit a beacon signal to stations through the communication module and that maintains the awake state during a predetermined period to receive information from the stations through the communication module after transmitting the beacon signal.

In another aspect of the present invention, an apparatus for controlling power consumption in a wireless network including stations having an awake state to receive or transmit information and a sleep state to save power, the apparatus including: a communication module that transmits data to at least one external station and coordinator and that receives data from at least one of external station and coordinator; and a controller maintains the awake state to transmit awake information to a coordinator during a predetermined period through the communication module and that maintains the awake state to receive a beacon signal from the coordinator during a beacon timeslot through the communication module, wherein the awake information indicates a change to the awake state of the coordinator.

It is to be understood that both the foregoing general description and the following detailed description are exemplary and explanatory and are intended to provide further explanation of the invention as claimed.

MODE FOR THE INVENTION

Reference will now be made in detail to embodiments of the present invention, examples of which are illustrated in the accompanying drawings.

It is noted that the following exemplary embodiments of the present invention may be modified into various forms, and the scope of the present invention including the appended claims and their equivalents is not limited to the following embodiments.

Figure 1:
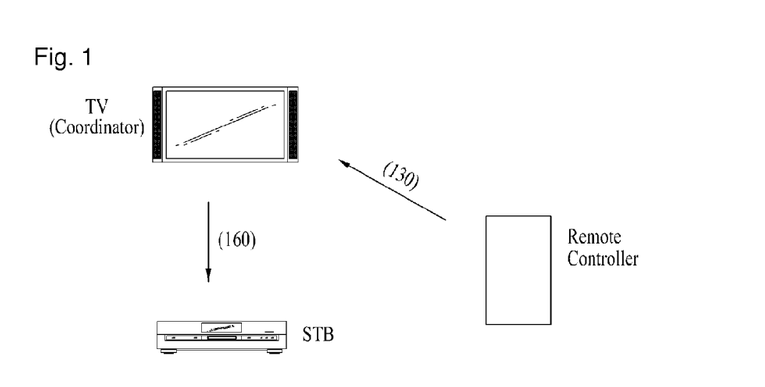
FIG. 1 is a diagram depicting a WPAN network including a TV and a settop box (STB) where the TV controls the power consumption of the TV and the settop box.

FIG. 1 is a diagram depicting a WPAN network including a TV and a settop box (STB) where the TV controls the power consumption of the TV and the settop box.

In general a WPAN coordinator is placed in sleep state except for a period of time when a beacon message is transmitted.

In FIG. 1, the TV is the coordinator and the STB is the peripheral station in the WPAN. A user controls the power to the various stations (i.e., turning stations on and off) via the coordinator.

In the WPAN shown in FIG. 1, both the coordinator (TV) and the peripheral station (STB) enter an awake state only during the beacon period. The awake state means that data may be transmitted or received while the power is turned on. On the other hand, the sleep state means that the power is turned off to reduce power consumption. In the sleep state, transmission and reception of data are impossible.

In this case, the TV awakes during a beacon timeslot to transmit a beacon signal. The STB also awakes during a beacon timeslot to receive the beacon signal transmitted by the TV.

Figure 2:
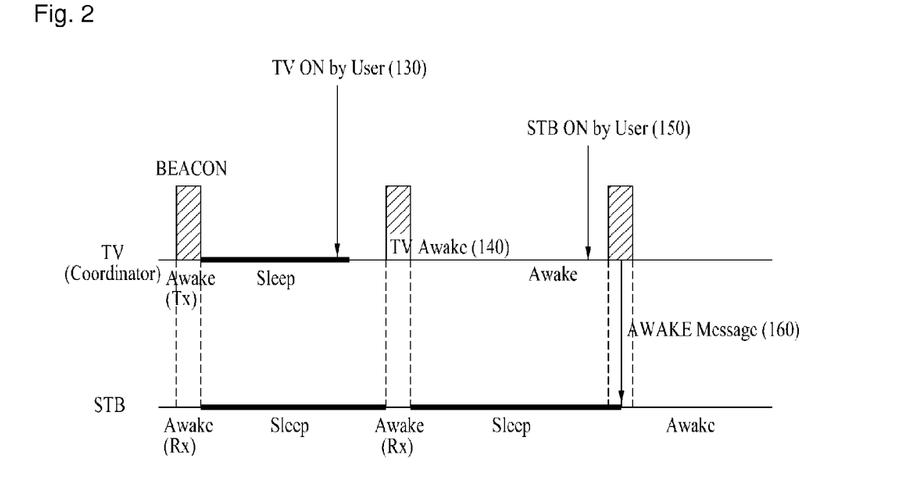
FIG. 2 is a diagram depicting the timing of a power control method according to one embodiment of the present invention.

FIG. 2 is a diagram depicting the timing of a power control method according to one embodiment of the present invention.

Referring to FIG. 2, an interval between one beacon transmission and the next beacon transmission or an interval between one beacon timeslot and the next beacon timeslot is defined as a beacon interval. One beacon interval corresponds to a communication frame.

First, a user turns on the TV at a specific moment using a remote control [130]. In this case, the remote control is assumed to be a general IrDa remote control, but other types of remote controls my be used as well.

As the TV is turned on, an internal communication module is activated [140]. Hence, the TV enters and maintains an awake state. Subsequently, the user turns on a settop box using the remote control [150]. Once the signal from the remote control is received by the TV, that is the coordinator, an awake message is delivered to the settop box from the TV [160]. The delivery of the awake message is accomplished using the beacon signal. Once the settop box has received the awake message, the settop box is turned on including a communication module within the settop box.

Figure 3:
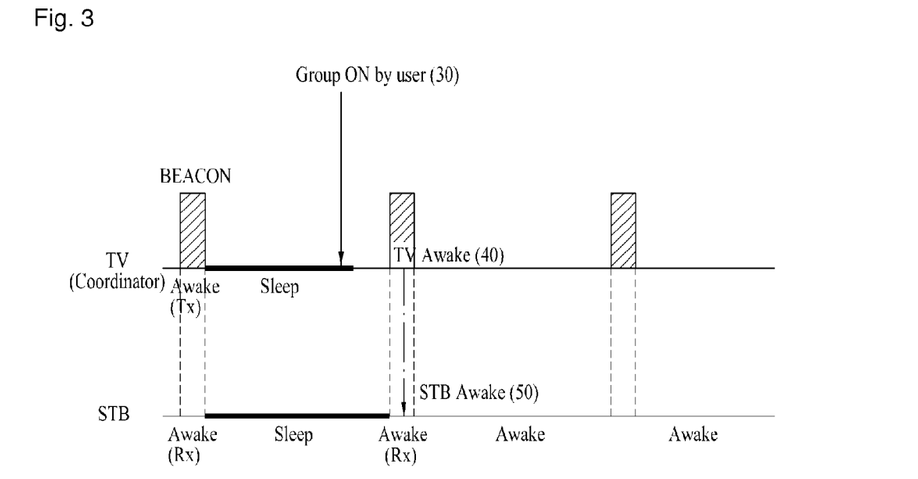
FIG. 3 is a diagram depicting the timing of a power control method according to the other embodiment of the present invention.

FIG. 3 is a diagram depicting the timing of a power control method according to the other embodiment of the present invention.

Referring to FIG. 3, the user may simultaneously turn on both the TV and the settop box using the remote control, too. This may be called the group on/off (GOO) case. In this case, the user sends a group wake-up signal to the TV via the remote control [30], and the settop box [50] is turned on along with the TV [40].

In FIGS. 2 and 3, the awake message for turning on the settop box is transmitted to the settop box in a beacon transmission timeslot indicated by a dotted line. Once the settop box receives this message, it is directly turned on to operate normally.

If a user would like to control a coordinator, such as the TV, via a peripheral station, such as a notebook computer, the user is unable to do so.

Figure 4:
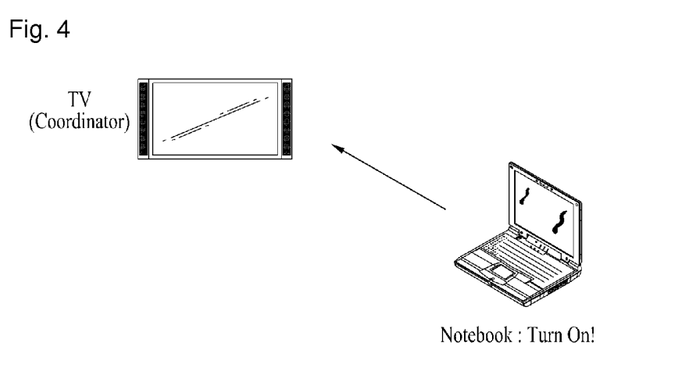
FIG. 4 is a diagram depicting a WPAN network including a TV and as a notebook computer.

In FIG. 4, the TV is the coordinator, and a notebook computer is the peripheral station. The TV and the notebook computer result in a WPAN like the WPAN in FIG. 1. In this case, the notebook (NB) computer is assumed to be a wireless station.

In the WPAN depicted in FIG. 4, both the TV (i.e., coordinator) and the notebook computer (i.e., peripheral station) may enter an awake state in the same manner as in FIG. 1. If the TV is awake, it may transmit a beacon signal, to wake-up the notebook computer. The notebook computer receives the beacon signal transmitted by the TV, and it wakes-up.

Figure 5:
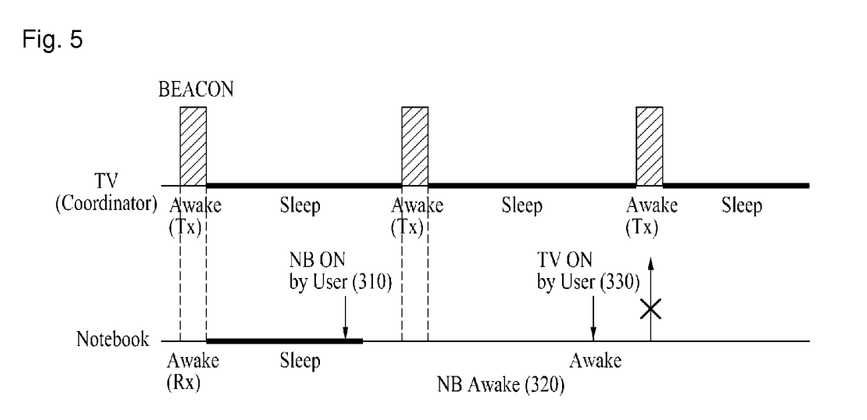
FIG. 5 is a diagram that depicts a notebook computer attempting to turn on the TV via the WPAN.

FIG. 5 is a diagram that depicts a notebook computer attempting to turn on the TV via the WPAN.

In FIG. 5, a user turns on a notebook computer (NB) [310]. Thus, power is supplied to the notebook computer, and a communication module of the notebook computer is turned on as well. In this situation, if the user attempts to turn on a TV (i.e., coordinator) via the notebook computer, it is unable to do so. This is because the coordinator wakes up during the beacon period and only transmits a beacon. It cannot receive a beacon signal from the notebook computer, because a timeslot for a peripheral station such as the notebook computer to transfer data to the coordinator does not exist. Thus, unless some other means such as an IrDa remote control is used, the peripheral station is unable to turn on or control a power of the coordinator via the WPAN. This results because the WPAN is configured such that the coordinator may only transmit a beacon signal and not receive a beacon signal during the beacon timeslot, even is a peripheral station attempts to transmit a beacon signal.

Figure 6:
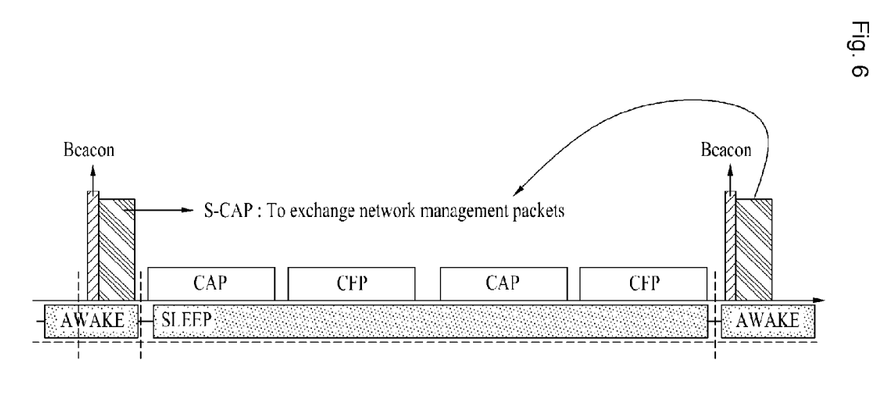
FIG. 6 depicts a communication timeline according to another embodiment of the present invention.

FIG. 6 depicts a communication timeline according to another embodiment of the present invention. A timeslot allowing a coordinator to exchange a control message with a peripheral station is allocated.

A typical WPAN communication frame includes a contention access period (CAP) and a contention free access period (CFP). When a station is in a sleep state, it is unable to transmit or receive during the CAP and CFP. Also shown is a communication timeslot (special CAP: S-CAP) for receiving a message or data from a peripheral station.

In FIG. 6, a S-CAP is located right next to the beacon timeslot. The S-CAP falls within in the period of time when the coordinator is awake in order to transmit the beacon signal. During the S-CAP a peripheral station is able to transmit a message relevant to a network management (e.g., a turn on command, association, etc.) to a coordinator.

As described above, if the S-CAP is defined, stations communicating with a coordinator can transmit data to the coordinator during the S-CAP. Consequently, the coordinator enters an awake state during the beacon timeslot and the S-CAP period but enters a sleep state during the rest of the frame. Therefore, a power reduction may be achieved.

Figure 7:
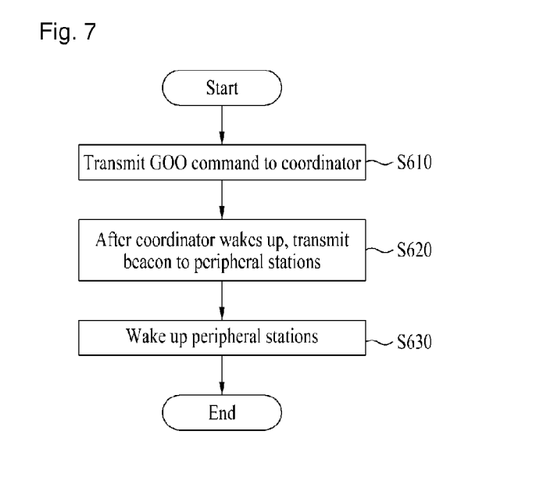
FIG. 7 is a flowchart depicting a power control method according to one embodiment of the present invention.

FIG. 7 is a flowchart depicting a power control method according to one embodiment of the present invention.

Referring to FIG. 7, a coordinator that operates in a sleep state except during the beacon timeslot determines whether a signal (GOO command) commanding a group wake-up is received [S610].

If the group wake-up signal is received, the coordinator enters an awake state and then transmits an awake message to a peripheral station via a beacon signal in a next beacon period [S620]. Having received the beacon signal, the peripheral station wakes up and enters the awake state [S630].

Figure 8:
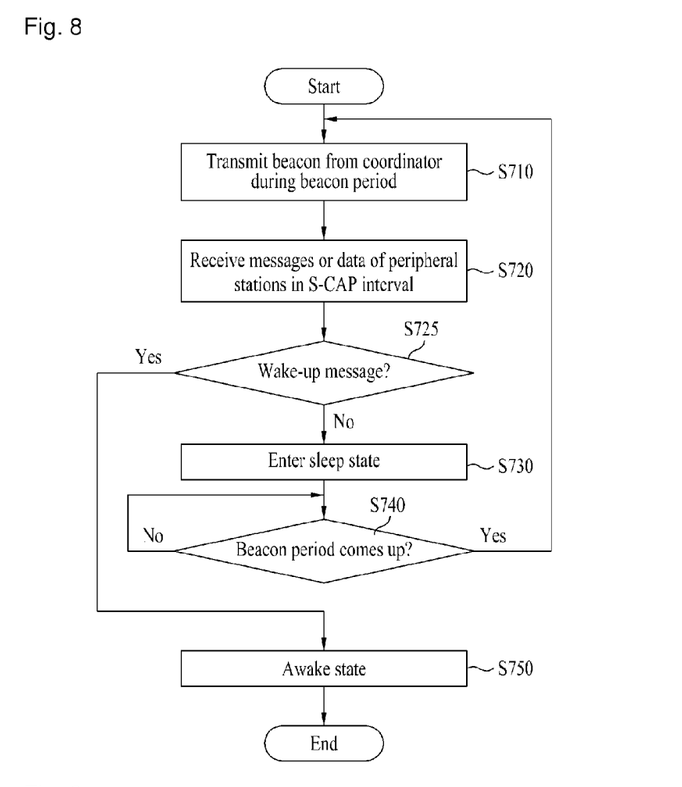
FIG. 8 is a flowchart depicting a power control method according to another embodiment of the present invention.

FIG. 8 is a flowchart depicting a power control method according to another embodiment of the present invention.

Referring to FIG. 8, a coordinator enters an awake state every communication frame and then transmits a beacon signal [S710].

For a predetermined duration or S-CAP after completion of the transmission of the beacon signal, the coordinator checks whether a message is received from a peripheral station [S720]. If a message is received from the peripheral station, the coordinator checks whether the received message is a wake-up message [S725].

If a message or data is not received from the peripheral station or a wake-up message is not received, the coordinator enters a sleep state [S730] and stands by until a next beacon period [S740].

If a message for instructing a wake-up of the coordinator is received within the predetermined duration or S-CAP, the coordinator enters the awake state and maintains the awake state [S750].

Figure 9:
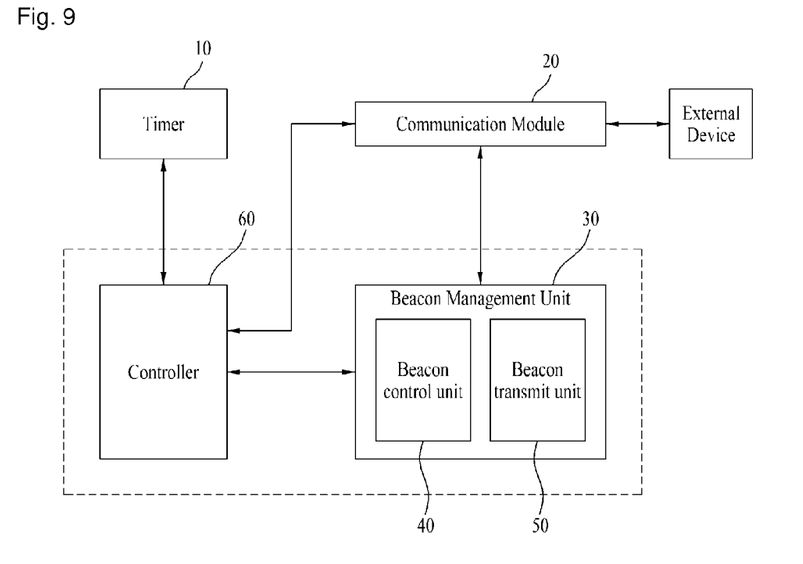
FIG. 9 is a block diagram depicting a coordinator according to one embodiment of the present invention.

FIG. 9 is a block diagram depicting a coordinator according to one embodiment of the present invention.

Referring to FIG. 9, a coordinator according to the present invention may include a timer 10, a communication module 20, a beacon management unit 30 and a controller 60. The beacon management unit 30 may include a beacon control unit 40 and a beacon transmit unit 50.

The timer 10 provides timing information related to the communication frame. This includes the start and end of a beacon timeslot and the interval between a beacon signal and a next beacon signal. The timer 10 also provides timing information such as the beginning time and length of the S-CAP period within the beacon timeslot as well as the location and length of the CAP and CFP in the communication frame.

The communication module 20 transmits and receives data or signals between the coordinator and other stations in the WPAN. For instance, the communication module 20 may transmit a beacon signal containing an awake message to a station.

The beacon management unit 30 manages information contained in a beacon signal, for example, control information, schedule information, etc. transmitted via the communication module 20. The beacon management unit 30 may include a beacon control unit 40 and a beacon transmit unit 50. The beacon control unit 40 may manage the awake message, the group awake message, and other awake information to be included in a beacon signal. The beacon transmit unit 50 transmits a beacon signal via the communication module 20.

The controller 60 controls the beacon management unit 30 to enable a beacon signal to be transmitted via the communication module 20. The controller 60 controls the coordinator to maintain an awake state during a beacon period or S-CAP within a beacon timeslot. The S-CAP exists within the beacon timeslot. The S-CAP may be adjacent to and contiguous with the beacon transmission, but is may be elsewhere within the beacon timeslot as well. Further, the S-CAP may be placed anywhere in the communication frame. If an awake message is received from a station, the controller 60 is able to place and maintain the coordinator in an awake state until another command is given. When a request to wake-up a specific station is received from another station, the controller 60 is able to transmit a command for waking up the specific station via a beacon signal.

In this description of the present embodiment, the functions of the controller 60 are separate from those of the beacon management unit 30, but, it is understood that the controller 60 may implement the functions of the beacon management unit 30 as well.

Figure 10:
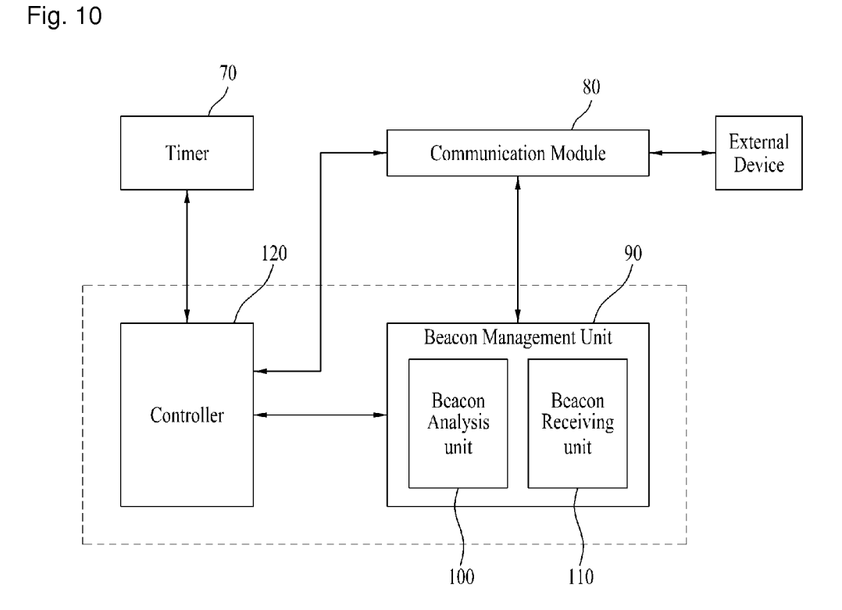
FIG. 10 is a block diagram depicting a station according to one embodiment of the present invention.

FIG. 10 is a block diagram depicting a station according to one embodiment of the present invention.

Referring to FIG. 10, a station according to the present invention may include a timer 70, a communication module 80, a beacon management unit 90 and a controller 120. The beacon management unit 120 may include a beacon analysis unit 100 and a beacon receiving unit 110.

The timer 70 provides timing information related to the communication frame. This includes the start and end of a beacon timeslot and the interval between a beacon signal and a next beacon signal. The timer 80 also provides timing information related to the communication frame. For instance, the timer 70 synchronizes with the beacon transmitted by the coordinator. It also synchronizes with S-CAP as defined by the coordinator.

The communication module 80 transmits and receives data or signals between the station, the coordinator and other stations in the WPAN. For instance, the communication module 20 may transmit an awake message during the S-CAP to the coordinator.

The beacon receiving unit 110 receives and detects a beacon signal the coordinator. The beacon analysis unit 100 analyzes the received beacon signal and obtains the information contained in the beacon signal. For instance, the beacon analysis unit 100 may recognize awake information within a beacon signal.

The controller 120 controls the power consumption and state of a station based on various kinds of information obtained from the beacon signal received, detected and analyzed by the beacon management unit 90. For instance, by receiving awake information and the like, the controller 120 may control the power consumption and state of a station. The controller 120 interfaces with the timer 70 to provide a message during the S-CAP period to wake up the coordinator.

In this description of the present embodiment, the functions of the controller 120 are separate from those of the beacon management unit 90, but, it is understood that the controller 120 may implement to functions of the beacon management unit 90.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The present invention includes waking-up a coordinator in a sleep state, entering an awake state and if a signal for turning on a peripheral station is received in the awake state, transmitting an awake message to the peripheral station via a beacon signal during a beacon timeslot. Accordingly, the power consumption of a coordinator in a WPAN network may be reduced, power control by a peripheral station may be facilitated, and inefficient operation and management of the network may be prevented.

The invention claimed is:

1. A method of controlling a coordinator for use in a wireless network including stations, the stations having an awake state to receive or transmit information and a sleep state to save power, the method comprising:
   transmitting a beacon signal to the stations during a beacon period, wherein the coordinator is placed in an awake state during the beacon period;
   receiving a message from at least one of the stations during a predetermined period, the predetermined period indicating a timeslot allocated between the beacon period and next beacon period and being able to receive data from the at least one of the stations;
   checking whether the received message is awake information for requesting a wake-up of the coordinator; and
   when the received message is the awake information for requesting the wake-up of the coordinator, maintaining the awake state of the coordinator during the predetermined period, when the received message is not the awake information for requesting the wake-up of the coordinator, changing the awake state of the coordinator to a sleep state.

2. The method of claim 1, wherein the predetermined period is contiguous with a beacon transmission.

3. A method for controlling a station for use in a wireless network including a coordinator, the station having an awake state to receive or transmit information and a sleep state to save power, the method comprising:
   transmitting first awake information to the coordinator during a predetermined period, wherein the first awake information indicates a message for requesting a wake-up of the coordinator, and wherein the predetermined period indicates a time slot allocated between the beacon period and next beacon period at least one of the station;
   receiving a beacon signal from the coordinator during a beacon timeslot, wherein the coordinator is placed in an awake state during the beacon timeslot, and wherein the beacon signal includes second awake information indicating a message for requesting a wake-up of the station; and
   changing a state of the station according to the second awake information when the station receives the beacon signal from the coordinator,
   wherein the state of the station is changed from the sleep state to the awake state.

4. The method of claim 3, wherein the predetermined period is contiguous with a beacon transmission.

5. An apparatus for controlling power consumption in a wireless network including stations having an awake state to receive or transmit information and a sleep state to save power, the apparatus comprising:
   a communication module configured to receive data from an external station and transmit data to the external station; and a controller configured to:
   transmit a beacon signal to the stations during a beacon period, wherein the coordinator is placed in an awake state during the beacon period,
   receive a message from at least one of the stations during a predetermined period, the predetermined period indicating a timeslot allocated between the beacon period and next beacon period and being able to receive data from the at least one of the stations,
   check whether the received message is awake information for requesting a wake-up of the coordinator, and
   when the received message is the awake information for requesting the wake-up of the coordinator, maintain the awake state of the coordinator during the predetermined period,
   when the received message is not the awake information for requesting the wake-up of the coordinator, change the awake state of the coordinator to a sleep state.

6. An apparatus for controlling power consumption in a wireless network including stations having an awake state to receive or transmit information and a sleep state to save power, the apparatus comprising:
   a communication module configured to:
   transmit data to at least one of station and coordinator; and
   receive data from the at least one of station and coordinator; and
   a controller configured to:
   transmit first awake information to the coordinator during a predetermined period, wherein the first awake information indicates a message for requesting a wake-up of the coordinator, and wherein the predetermined period indicates a time slot allocated between the beacon period and next beacon period and being able to receive data from at least one of the stations;
   receive a beacon signal from the coordinator during a beacon period, wherein the coordinator is placed in an awake state during the beacon timeslot, and wherein the beacon signal includes a second awake information indicating a message for requesting a wake-up of the station; and
   change a state of the station according to the second awake information when the station receives the beacon signal from the coordinator,
   wherein the state of the station is changed from the sleep state to the awake state.

* * * * *